US008515342B2

(12) United States Patent
Ho

(10) Patent No.: US 8,515,342 B2
(45) Date of Patent: Aug. 20, 2013

(54) DYNAMIC CURRENT SHARING IN KA/KU LNB DESIGN

(75) Inventor: Kesse Ho, Westminster, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 159 days.

(21) Appl. No.: 11/546,689

(22) Filed: Oct. 12, 2006

(65) Prior Publication Data

US 2007/0082610 A1 Apr. 12, 2007

Related U.S. Application Data

(60) Provisional application No. 60/725,781, filed on Oct. 12, 2005, provisional application No. 60/725,782, filed on Oct. 12, 2005, provisional application No. 60/726,118, filed on Oct. 12, 2005, provisional application No. 60/726,149, filed on Oct. 12, 2005, provisional application No. 60/726,150, filed on Oct. 12, 2005, provisional application No. 60/726,151, filed on Oct. 12, 2005, provisional application No. 60/727,143, filed on Oct. 14, 2005, provisional application No. 60/726,338, filed on Oct. 12, 2005, provisional application No. 60/754,737, filed on Dec. 28, 2005, provisional application No. 60/758,762, filed on Jan. 13, 2006, provisional application No. 60/726,337, filed on Oct. 12, 2005.

(51) Int. Cl.
*H04B 7/185* (2006.01)

(52) U.S. Cl.
USPC ......... 455/13.4; 323/273; 343/703; 455/3.02; 713/300; 725/63

(58) Field of Classification Search
USPC ........................................................ 455/13.4
See application file for complete search history.

(56) References Cited

U.S. PATENT DOCUMENTS

| | | | | |
|---|---|---|---|---|
| 4,150,424 | A * | 4/1979 | Nuechterlein | 363/26 |
| 4,211,895 | A * | 7/1980 | Davis et al. | 370/384 |
| 4,319,318 | A * | 3/1982 | Rippel et al. | 363/138 |

(Continued)

FOREIGN PATENT DOCUMENTS

WO WO 2004/054128 6/2004

OTHER PUBLICATIONS

EPO Communication dated Feb. 11, 2009 in European Patent Application No. 06825835.9 filed Oct. 12, 2006 by Kesse Ho.

(Continued)

*Primary Examiner* — Hai Nguyen

(57) ABSTRACT

A method, apparatus and system providing power to Low Noise Block Amplifiers (LNBs) in a satellite signal receiving system wherein at least one receiver provides power to the LNBs. A system in accordance with the present invention comprises a first stage of power regulation, coupled to the at least one receiver in a respective fashion, wherein the first stage of power regulation comprises linear regulation, and a second stage of power regulation, coupled between the first stage of power regulation and the LNBs, wherein the second stage of power regulation comprises a switching power regulator. Another embodiment of the present invention comprises a first stage of power regulation, coupled to the at least one receiver in a respective fashion, wherein the first stage of power regulation comprises a switching power regulator, and a second stage of power regulation, coupled between the first stage of power regulation and the LNBs, wherein the second stage of power regulation comprises a linear regulator.

9 Claims, 5 Drawing Sheets

(56) References Cited

U.S. PATENT DOCUMENTS 4,352,153 A * 9/1982 Voyer .......... 363/26
4,656,486 A 4/1987 Turner
4,860,021 A 8/1989 Kurosawa et al.
4,912,621 A * 3/1990 Kobayashi et al. .......... 363/71
4,924,170 A * 5/1990 Henze .......... 323/272
5,617,107 A 4/1997 Fleming
5,646,509 A * 7/1997 Berglund et al. .......... 713/321
5,675,480 A * 10/1997 Stanford .......... 307/58
5,694,138 A * 12/1997 Crosby .......... 343/704
5,708,963 A * 1/1998 Mobley et al. .......... 455/12.1
5,734,356 A 3/1998 Chang
5,787,335 A 7/1998 Novak
5,861,855 A * 1/1999 Arsenault et al. .......... 343/704
5,935,252 A * 8/1999 Berglund et al. .......... 713/300
5,940,737 A * 8/1999 Eastman .......... 725/68
5,959,592 A 9/1999 Petruzzelli
5,982,333 A 11/1999 Stillinger et al.
6,003,139 A * 12/1999 McKenzie .......... 713/300
6,011,597 A 1/2000 Kubo
6,029,044 A * 2/2000 Arsenault et al. .......... 725/68
6,079,026 A * 6/2000 Berglund et al. .......... 713/340
6,188,372 B1 2/2001 Jackson et al.
6,195,302 B1 * 2/2001 Hardee .......... 365/205
6,199,130 B1 * 3/2001 Berglund et al. .......... 710/302
6,262,900 B1 * 7/2001 Suntio .......... 363/69
6,272,313 B1 * 8/2001 Arsenault et al. .......... 455/3.02
6,301,310 B1 * 10/2001 Jackson et al. .......... 375/309
6,340,956 B1 1/2002 Bowen et al.
6,396,167 B1 * 5/2002 Simburger et al. .......... 307/43
6,396,169 B1 * 5/2002 Voegeli et al. .......... 307/52
6,421,259 B1 * 7/2002 Brooks et al. .......... 363/84
6,424,817 B1 7/2002 Hadden
6,430,233 B1 * 8/2002 Dillon et al. .......... 375/316
6,441,782 B2 * 8/2002 Kelly et al. .......... 342/359
6,441,797 B1 8/2002 Shah
6,470,382 B1 * 10/2002 Wang et al. .......... 709/220
6,486,907 B1 11/2002 Farber
6,496,061 B1 * 12/2002 Bloom et al. .......... 330/51
6,501,423 B2 * 12/2002 Kelly et al. .......... 342/359
6,515,541 B2 * 2/2003 Cheng et al. .......... 330/51
6,563,294 B2 * 5/2003 Duffy et al. .......... 323/283
6,600,730 B1 7/2003 Davis et al.
6,622,307 B1 * 9/2003 Ho .......... 725/120
6,640,084 B2 * 10/2003 Pande et al. .......... 455/3.01
6,650,869 B2 * 11/2003 Kelly et al. .......... 455/13.2
6,653,981 B2 11/2003 Wang et al.
6,693,587 B1 * 2/2004 Kuether et al. .......... 342/359
6,728,513 B1 4/2004 Nishina
6,754,720 B1 * 6/2004 Packer .......... 710/3
6,762,727 B2 7/2004 Rochford et al.
6,763,221 B2 * 7/2004 Chandler .......... 455/3.01
6,788,035 B2 * 9/2004 Bassett et al. .......... 323/272
6,861,999 B2 * 3/2005 Suga .......... 343/786
6,864,855 B1 3/2005 Fujita
6,879,301 B2 4/2005 Kozlovski
6,906,673 B1 6/2005 Matz et al.
6,915,440 B2 * 7/2005 Berglund et al. .......... 713/340
6,928,273 B2 * 8/2005 Nitta .......... 455/127.5
6,930,893 B2 * 8/2005 Vinciarelli .......... 363/17
6,936,999 B2 * 8/2005 Chapuis .......... 323/282
6,944,878 B1 * 9/2005 Wetzel et al. .......... 725/72
6,949,916 B2 * 9/2005 Chapuis .......... 323/282
6,954,623 B2 * 10/2005 Chang et al. .......... 455/127.1
6,957,039 B2 * 10/2005 Imai .......... 455/3.02
6,961,538 B2 * 11/2005 Arsenault et al. .......... 455/3.02
6,965,502 B2 * 11/2005 Duffy et al. .......... 361/18
6,965,581 B2 * 11/2005 Nguyen et al. .......... 370/316
6,985,695 B1 * 1/2006 Kato .......... 455/3.02
6,987,741 B2 * 1/2006 Kelly et al. .......... 370/321
6,996,389 B2 * 2/2006 Fitzpatrick et al. .......... 455/343.1
7,000,125 B2 * 2/2006 Chapuis et al. .......... 713/300
7,016,643 B1 * 3/2006 Kuether et al. .......... 455/3.02
7,049,798 B2 * 5/2006 Chapuis et al. .......... 323/282
7,052,176 B2 * 5/2006 Stephan et al. .......... 374/122
RE39,202 E * 7/2006 Gurantz .......... 725/71
7,072,627 B2 * 7/2006 Coffin, III .......... 455/137
7,080,265 B2 * 7/2006 Thaker et al. .......... 713/300
7,082,488 B2 * 7/2006 Larson et al. .......... 710/301
7,103,697 B2 * 9/2006 Scordalakes .......... 710/302
7,123,649 B1 * 10/2006 Smith et al. .......... 375/222
7,130,576 B1 * 10/2006 Gurantz et al. .......... 455/3.02
7,136,618 B2 * 11/2006 Kato et al. .......... 455/3.02
7,149,470 B1 * 12/2006 Shah et al. .......... 455/3.02
7,151,807 B2 * 12/2006 Chen .......... 375/329
7,164,661 B2 * 1/2007 Kelly .......... 370/323
7,177,970 B2 * 2/2007 Kondo et al. .......... 710/306
7,203,457 B1 * 4/2007 Wetzel .......... 455/3.02
7,206,591 B2 * 4/2007 Ammar et al. .......... 455/502
7,206,944 B2 * 4/2007 Odaohhara et al. .......... 713/300
7,207,054 B1 * 4/2007 Richards et al. .......... 725/72
7,239,285 B2 7/2007 Cook
7,240,357 B1 * 7/2007 Arsenault et al. .......... 725/68
7,262,585 B2 * 8/2007 May .......... 323/273
7,269,386 B2 * 9/2007 Coffin, III .......... 455/3.02
7,283,784 B2 * 10/2007 Smith et al. .......... 455/3.02
7,289,424 B1 * 10/2007 Stenerson et al. .......... 370/204
7,336,706 B2 * 2/2008 Krafft et al. .......... 375/238
7,369,809 B1 * 5/2008 Wang .......... 455/12.1
7,373,527 B2 * 5/2008 Chapuis .......... 713/300
7,463,582 B2 * 12/2008 Kelly et al. .......... 370/229
7,463,676 B2 * 12/2008 Chen .......... 375/222
7,477,871 B1 * 1/2009 Gurantz et al. .......... 455/3.01
7,499,671 B2 * 3/2009 Kozaki et al. .......... 455/3.02
7,506,179 B2 * 3/2009 Templeton .......... 713/300
7,512,963 B2 * 3/2009 Jeon .......... 725/68
7,522,875 B1 * 4/2009 Gurantz et al. .......... 455/3.01
7,526,264 B2 * 4/2009 Bargroff et al. .......... 455/140
7,542,715 B1 * 6/2009 Gurantz et al. .......... 455/3.01
7,570,687 B2 * 8/2009 Smith et al. .......... 375/222
7,587,736 B2 * 9/2009 Summers et al. .......... 725/95
7,653,757 B1 * 1/2010 Fernald et al. .......... 710/3
7,679,345 B1 * 3/2010 Verma et al. .......... 323/273
7,685,320 B1 * 3/2010 Wishneusky .......... 710/3
7,730,332 B1 * 6/2010 Templeton .......... 713/300
7,738,596 B2 * 6/2010 Lin et al. .......... 375/316
7,739,717 B1 * 6/2010 Kuether et al. .......... 725/107
7,793,005 B1 * 9/2010 Fernald et al. .......... 710/3
7,877,089 B2 * 1/2011 Wang .......... 455/427
7,904,110 B2 * 3/2011 Young et al. .......... 455/552.1
7,908,402 B2 * 3/2011 Fernald et al. .......... 710/3
7,954,127 B2 * 5/2011 James et al. .......... 725/81
8,072,174 B2 * 12/2011 Campbell et al. .......... 318/600
8,193,864 B2 * 6/2012 Model .......... 330/297
8,253,354 B2 * 8/2012 Niemi .......... 318/16
8,291,455 B2 * 10/2012 Tsai et al. .......... 725/68
2001/0043573 A1 * 11/2001 Kelly .......... 370/316
2001/0043574 A1 * 11/2001 Nguyen et al. .......... 370/316
2001/0043575 A1 * 11/2001 Kelly .......... 370/321
2001/0045906 A1 * 11/2001 Kelly et al. .......... 342/359
2001/0048669 A1 * 12/2001 Kelly et al. .......... 370/316
2001/0048670 A1 * 12/2001 Kelly et al. .......... 370/316
2001/0048671 A1 * 12/2001 Kelly et al. .......... 370/316
2002/0000931 A1 * 1/2002 Petronic et al. .......... 342/359
2002/0004369 A1 * 1/2002 Kelly et al. .......... 455/12.1
2002/0009058 A1 * 1/2002 Kelly et al. .......... 370/316
2002/0044094 A1 * 4/2002 May .......... 343/703
2002/0098803 A1 * 7/2002 Poulton et al. .......... 455/13.1
2002/0122511 A1 * 9/2002 Kwentus et al. .......... 375/343
2002/0128043 A1 * 9/2002 Chandler .......... 455/561
2002/0137483 A1 * 9/2002 Smith et al. .......... 455/130
2002/0154055 A1 * 10/2002 Davis et al. .......... 342/352
2002/0158797 A1 * 10/2002 Kelly et al. .......... 342/359
2002/0190790 A1 * 12/2002 Cheng et al. .......... 330/51
2003/0023978 A1 1/2003 Bajgrowitz
2003/0050015 A1 * 3/2003 Kelly et al. .......... 455/67.4
2003/0058810 A1 * 3/2003 Petronic .......... 370/316
2003/0070020 A1 * 4/2003 Kondo et al. .......... 710/120
2003/0112878 A1 * 6/2003 Kloper .......... 375/259
2003/0129960 A1 7/2003 Kato
2003/0142513 A1 * 7/2003 Vinciarelli .......... 363/17
2003/0163820 A1 * 8/2003 Knutson et al. .......... 725/63
2003/0163821 A1 * 8/2003 Knutson et al. .......... 725/63
2003/0163822 A1 * 8/2003 Knutson et al. .......... 725/68
2003/0190902 A1 * 10/2003 Horie et al. .......... 455/272

2003/0217362 A1* 11/2003 Summers et al. ............... 725/63
2003/0218574 A1* 11/2003 Suga ............................ 343/786
2004/0028149 A1* 2/2004 Krafft et al. .................. 375/316
2004/0033780 A1* 2/2004 Kelly .......................... 455/11.1
2004/0060065 A1* 3/2004 James et al. .................... 725/71
2004/0093533 A1* 5/2004 Chapuis et al. ................. 714/22
2004/0123164 A1* 6/2004 Chapuis et al. ............... 713/300
2004/0123167 A1* 6/2004 Chapuis ....................... 713/300
2004/0135560 A1* 7/2004 Kernahan et al. ............. 323/282
2004/0141575 A1* 7/2004 Chen ............................ 375/371
2004/0192190 A1* 9/2004 Motoyama .................. 455/3.02
2004/0203425 A1* 10/2004 Coffin, III .................. 455/67.11
2004/0209584 A1* 10/2004 Bargroff et al. ............ 455/180.1
2004/0217817 A1* 11/2004 Huang ......................... 330/295
2004/0229562 A1* 11/2004 Wren et al. .................. 455/3.02
2004/0255070 A1* 12/2004 Larson et al. ................. 710/305
2005/0008100 A1* 1/2005 Chen ............................ 375/329
2005/0048993 A1* 3/2005 Ammar et al. ................ 455/502
2005/0052335 A1 3/2005 Chen
2005/0053118 A1* 3/2005 Stephan et al. ............... 374/122
2005/0057428 A1 3/2005 Fujita
2005/0066367 A1* 3/2005 Fyke et al. ...................... 725/68
2005/0068704 A1* 3/2005 Kozaki ............................ 361/90
2005/0124289 A1* 6/2005 Coffin, III .................... 455/3.02
2005/0176472 A1* 8/2005 Fitzpatrick et al. ........... 455/572
2005/0184923 A1 8/2005 Saito et al.
2005/0289605 A1* 12/2005 Jeon ............................... 725/68
2006/0172783 A1* 8/2006 Leung et al. .................. 455/572
2006/0176843 A1* 8/2006 Gat et al. ...................... 370/316
2006/0225098 A1* 10/2006 James et al. .................... 725/63
2006/0225099 A1* 10/2006 James et al. .................... 725/63
2006/0225100 A1* 10/2006 James et al. .................... 725/63
2006/0225101 A1* 10/2006 James et al. .................... 725/68
2006/0225102 A1* 10/2006 James et al. .................... 725/68
2006/0225103 A1* 10/2006 James et al. .................... 725/68
2006/0225104 A1* 10/2006 James et al. .................... 725/68
2006/0251115 A1* 11/2006 Haque et al. .................. 370/466
2006/0259929 A1* 11/2006 James et al. .................... 725/71
2006/0261788 A1* 11/2006 May ............................. 323/273
2006/0277578 A1* 12/2006 Goldblatt et al. ............... 725/68
2007/0075909 A1* 4/2007 Flynn et al. ................... 343/840
2007/0079338 A1* 4/2007 Baird et al. ..................... 725/63
2007/0091990 A1* 4/2007 Smith et al. ................... 375/222
2007/0111661 A1* 5/2007 Bargroff et al. .............. 455/13.3
2007/0129010 A1* 6/2007 Chen ............................ 455/13.4
2007/0220559 A1* 9/2007 James et al. .................... 725/63
2007/0250909 A1* 10/2007 James et al. ...................... 726/4
2007/0294731 A1* 12/2007 Arsenault et al. ............... 725/70
2007/0296469 A1* 12/2007 Fitzpatrick .................... 327/103
2008/0016535 A1* 1/2008 James et al. .................... 725/63
2008/0018545 A1* 1/2008 Kaplan et al. ................. 343/713
2008/0102761 A1* 5/2008 Pham et al. ..................... 455/76
2008/0307466 A1* 12/2008 Wang ............................. 725/68
2009/0058397 A1* 3/2009 Fitzpatrick et al. ............. 324/72
2010/0053836 A1* 3/2010 Xiu et al. ...................... 361/119
2010/0071009 A1* 3/2010 Xiu et al. ........................ 725/64
2010/0201337 A1* 8/2010 Bradbury ...................... 323/288
2011/0231881 A1* 9/2011 James et al. .................... 725/67

OTHER PUBLICATIONS

EPO Communication dated Jun. 30, 2009 in European Patent Application No. 06825835.9 filed Oct. 12, 2006 by Kesse Ho.

EPO Communication dated Nov. 19, 2009 in European patent application No. 06825835.9 filed Oct. 12, 2006 by Kesse Ho.

* cited by examiner

DYNAMIC CURRENT SHARING IN KA/KU LNB DESIGN

CROSS-REFERENCE TO RELATED APPLICATIONS

This application claims the benefit under 35 U.S.C. §119 (e) of the following commonly-assigned U.S. provisional patent applications:

Application Ser. No. 60/725,781, filed on Oct. 12, 2005 by John L. Norin and Kesse Ho, entitled "TRIPLE STACK COMBINING APPROACH TO Ka/Ku SIGNAL DISTRIBUTION,";

Application Ser. No. 60/725,782, filed on Oct. 12, 2005 by Kesse Ho and John L. Norin, entitled "SINGLE LOCAL OSCILLATOR SHARING IN MULTI-BAND KA-BAND LNBS,";

Application Ser. No. 60/726,118, filed on Oct. 12, 2005 by John L. Norin, entitled "KA/KU ANTENNA ALIGNMENT,";

Application Ser. No. 60/726,149, filed on Oct. 12, 2005 by Kesse Ho, entitled "DYNAMIC CURRENT SHARING IN KA/KU LNB DESIGN,";

Application Ser. No. 60/726,150, filed on Oct. 12, 2005 by Kesse Ho, entitled "KA LNB UMBRELLA SHADE,";

Application Ser. No. 60/726,151, filed on Oct. 12, 2005 by John L. Norin and Kesse Ho, entitled "BAND UPCONVERTER APPROACH TO KA/KU SIGNAL DISTRIBUTION,";

Application Ser. No. 60/727,143, filed on Oct. 14, 2005 by John L. Norin and Kesse Ho, entitled "BAND UPCONVERTER APPROACH TO KA/KU SIGNAL DISTRIBUTION,";

Application Ser. No. 60/726,338, filed on Oct. 12, 2005 by John L. Norin, Kesse Ho, Mike A. Frye, and Gustave Stroes, entitled "NOVEL ALIGNMENT METHOD FOR MULTI-SATELLITE CONSUMER RECEIVE ANTENNAS,";

Application Ser. No. 60/754,737, filed on Dec. 28, 2005 by John L. Norin, entitled "KA/KU ANTENNA ALIGNMENT,";

Application Ser. No. 60/758,762, filed on Jan. 13, 2006 by Kesse Ho, entitled "KA LNB UMBRELLA SHADE,"; and Application Ser. No. 60/726,337, filed Oct. 12, 2005, entitled "ENHANCED BACK ASSEMBLY FOR KA/KU ODU," by Michael A. Frye et al., all of which applications are incorporated by reference herein.

BACKGROUND OF THE INVENTION

1. Field of the Invention

The present invention relates generally to a satellite receiver system, and in particular, to an alignment method for multi-band consumer receiver antennas.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 (with transponders 28, 30, and 32 converted to transponders 8, 10, and 12, respectively), that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to television 114 for viewing by a user. There can be more than one satellite transmitting from each orbital location.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different sets of frequencies, often referred to as transponders, which are licensed to various users for broadcasting of programming, which can be audio, video, or data signals, or any combination. These signals have typically been located in the Ku-band Fixed Satellite Service (FSS) and Broadcast Satellite Service (BSS) bands of frequencies in the 10-13 GHz range. Future satellites will likely also broadcast in a portion of the Ka-band with frequencies of 18-21 GHz Typically, the IRD 112 powers the ODU 108 through the cables between IRD 112 and ODU 108. However, with additional satellites being positioned for delivery of additional downlink signals 120, IRD 112 may have difficulty providing power to ODU 108 in a consistent and proper format. If the power is not delivered properly, the signals from the additional satellites will not be properly received, rendering these signals useless for data and video transmission.

It can be seen, then, that there is a need in the art for a system that can properly power up the ODU.

SUMMARY OF THE INVENTION

To minimize the limitations in the prior art, and to minimize other limitations that will become apparent upon reading and understanding the present specification, the present invention discloses a method, apparatus and system providing power to Low Noise Block Amplifiers (LNBs) in a satellite signal receiving system. wherein at least one receiver provides power to the LNBs. A system in accordance with the present invention comprises a first stage of power regulation, coupled to the at least one receiver in a respective fashion, wherein the first stage of power regulation comprises linear regulation, and a second stage of power regulation, coupled between the first stage of power regulation and the LNBs, wherein the second stage of power regulation comprises a switching power regulator.

Another embodiment of the present invention comprises a first stage of power regulation, coupled to the at least one receiver in a respective fashion, wherein the first stage of power regulation comprises a switching power regulator, and a second stage of power regulation, coupled between the first stage of power regulation and the LNBs, wherein the second stage of power regulation comprises a linear regulator.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Figure 1:
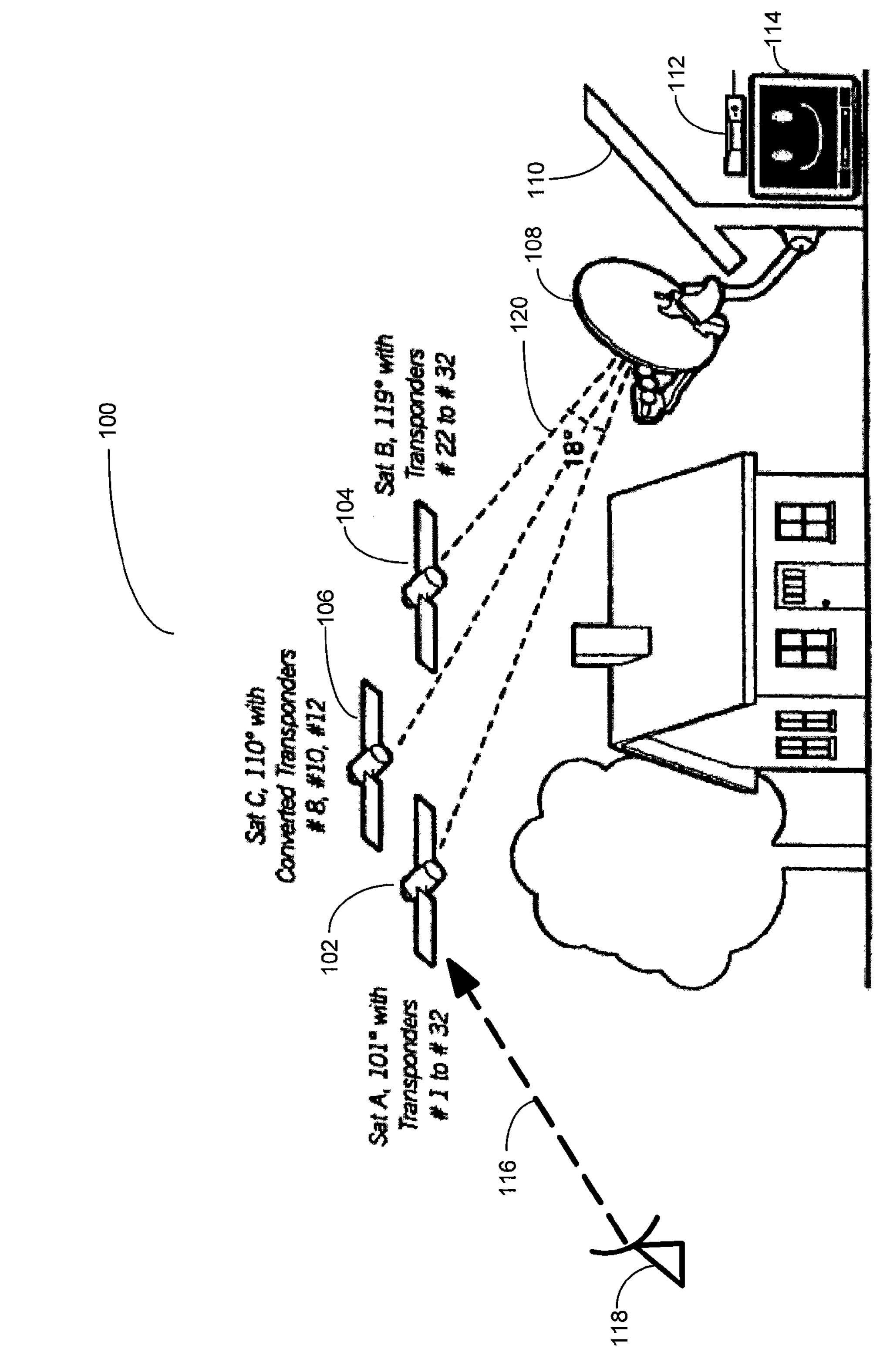
FIG. 1 PRIOR ART
FIG. 1 illustrates a typical satellite television installation of the related art.
Figure 2:
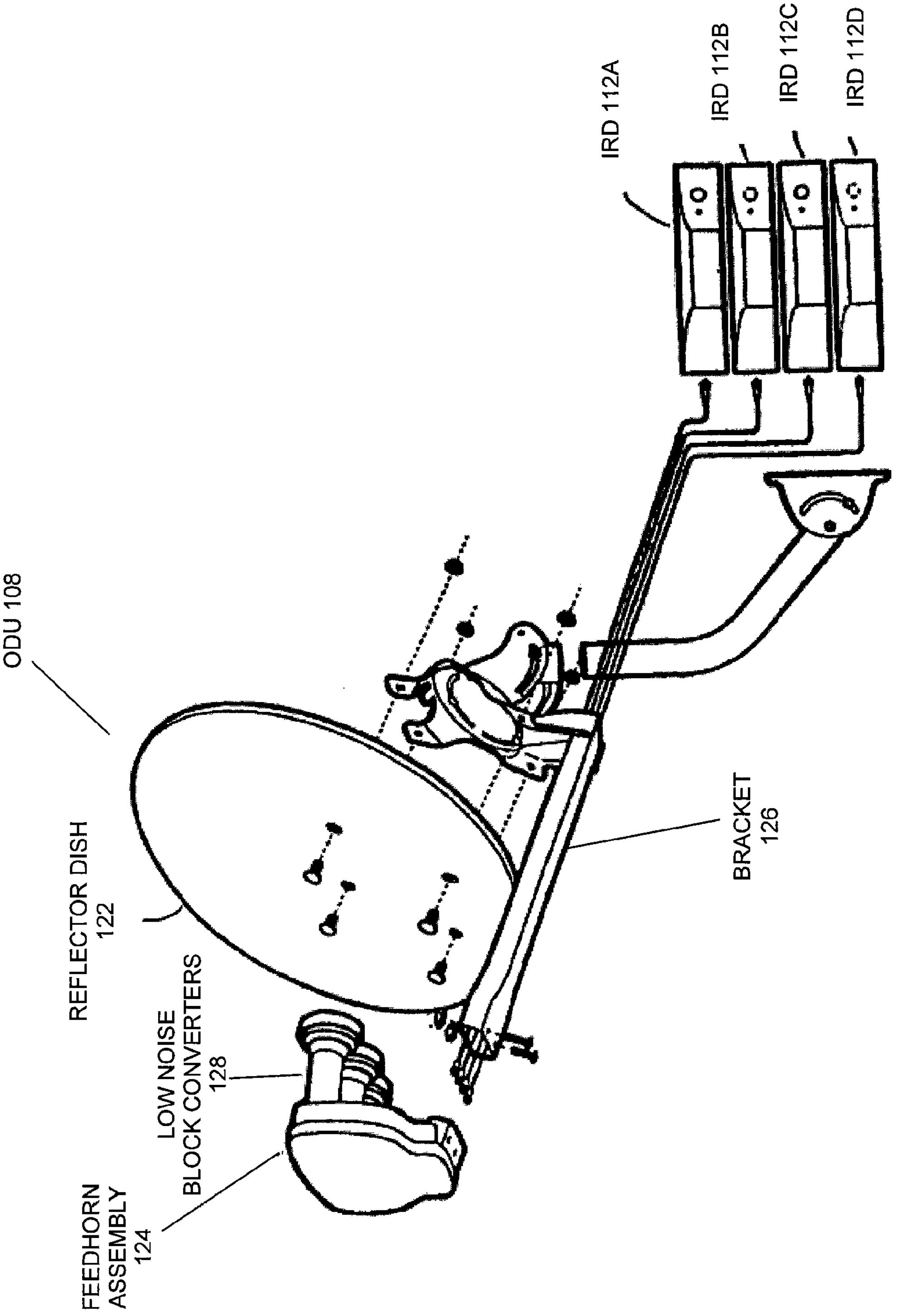
FIG. 2 illustrates a typical ODU of the present invention.

FIG. 2 illustrates a typical ODU of the related art.

ODU 108 typically uses reflector dish 122 and feedhorn assembly 124 to receive and direct downlink signals 120 onto feedhorn assembly 124. Reflector dish 122 and feedhorn assembly 124 are typically mounted on bracket 126 and attached to a structure for stable mounting. Feedhorn assembly 124 typically comprises one or more Low Noise Block converters 128, which are connected via wires or coaxial cables to a multiswitch, which can be located within feedhorn assembly 124, elsewhere on the ODU 108, or within house 110. LNBs typically downconvert the FSS and/or BSS-band, Ku-band, and Ka-band downlink signals 120 into frequencies that are easily transmitted by wire or cable, which are typically in the L-band of frequencies, which typically ranges from 950 MHz to 2150 MHz. This downconversion makes it possible to distribute the signals within a home using standard coaxial cables.

The multiswitch enables system 100 to selectively switch the signals from SatA 102, SatB 104, and SatC 106, and deliver these signals via cables 124 to each of the IRDs 112A-D located within house 110. Typically, the multiswitch is a five-input, four-output (5×4) multiswitch, where two inputs to the multiswitch are from SatA 102, one input to the multiswitch is from SatB 104, and one input to the multiswitch is a combined input from SatB 104 and SatC 106. There can be other inputs for other purposes, e.g., off-air or other antenna inputs, without departing from the scope of the present invention. The multiswitch can be other sizes, such as a 6×8 multiswitch, if desired. SatB 104 typically delivers local programming to specified geographic areas, but can also deliver other programming as desired.

To maximize the available bandwidth in the Ku-band of downlink signals 120, each broadcast frequency is further divided into polarizations. Each LNB 128 can receive both orthogonal polarizations at the same time with parallel sets of electronics, so with the use of either an integrated or external multiswtich, downlink signals 120 can be selectively filtered out from travelling through the system 100 to each IRD 112A-D.

IRDs 112A-D currently use a one-way communications system to control the multiswitch. Each IRD 112A-D has a dedicated cable 124 connected directly to the multiswitch, and each IRD independently places a voltage and signal combination on the dedicated cable to program the multiswitch. For example, IRD 112A may wish to view a signal that is provided by SatA 102. To receive that signal, IRD 112A sends a voltage/tone signal on the dedicated cable back to the multiswitch, and the multiswitch delivers the satA 102 signal to IRD 12A on dedicated cable 124. IRD 112B independently controls the output port that IRD 112B is coupled to, and thus may deliver a different voltage/tone signal to the multiswitch. The voltage/tone signal typically comprises a 13 Volts DC (VDC) or 18 VDC signal, with or without a 22 kHz tone superimposed on the DC signal. 13VDC without the 22 kHz tone would select one port, 13VDC with the 22 kHz tone would select another port of the multiswitch, etc. There can also be a modulated tone, typically a 22 kHz tone, where the modulation schema can select one of any number of inputs based on the modulation scheme. For simplicity and cost savings, this control system has been used with the constraint of 4 cables coming for a single feedhorn assembly 124, which therefore only requires the 4 possible state combinations of tone/no-tone and hi/low voltage.

To reduce the cost of the ODU 108, outputs of the LNBs 128 present in the ODU 108 can be combined, or "stacked," depending on the ODU 108 design. The stacking of the LNB 128 outputs occurs after the LNB has received and downconverted the input signal. This allows for multiple polarizations, one from each satellite 102-106, to pass through each LNB 128. So one LNB 128 can, for example, receive the Left Hand Circular Polarization (LHCP) signals from SatC 102 and SatB 104, while another LNB receives the Right Hand Circular Polarization (RHCP) signals from SatB 104, which allows for fewer wires or cables between the feedhorn assembly 124 and the multiswitch.

The Ka-band of downlink signals 120 will be further divided into two bands, an upper band of frequencies called the "A" band and a lower band of frequencies called the "B" band. Once satellites are deployed within system 100 to broadcast these frequencies, the various LNBs 128 in the feedhorn assembly 124 can deliver the signals from the Ku-band, the A band Ka-band, and the B band Ka-band signals for a given polarization to the multiswitch. However, current IRD 112 and system 100 designs cannot tune across this entire resulting frequency band without the use of more than 4 cables, which limits the usefulness of this frequency combining feature.

By stacking the LNB 128 inputs as described above, each LNB 128 typically delivers 48 transponders of information to the multiswitch, but some LNBs 128 can deliver more or less in blocks of various size. The multiswitch allows each output of the multiswitch to receive every LNB 128 signal (which is an input to the multiswitch) without filtering or modifying that information, which allows for each IRD 112 to receive more data. However, as mentioned above, current IRDs 112 cannot use the information in some of the proposed frequencies used for downlink signals 120, thus rendering useless the information transmitted in those downlink signals 120.

The problem with the additional LNBs 128 that will be required for a Ka-band system 100 is that IRD 112 will have difficulty providing power to all of the LNBs 128 simultaneously. The current drawn by the LNBs 128 is significant, and, as such, the present invention provides a method and system for providing the current to the LNBs 128 in an efficient manner.

Current Sharing Schema

Figure 3:
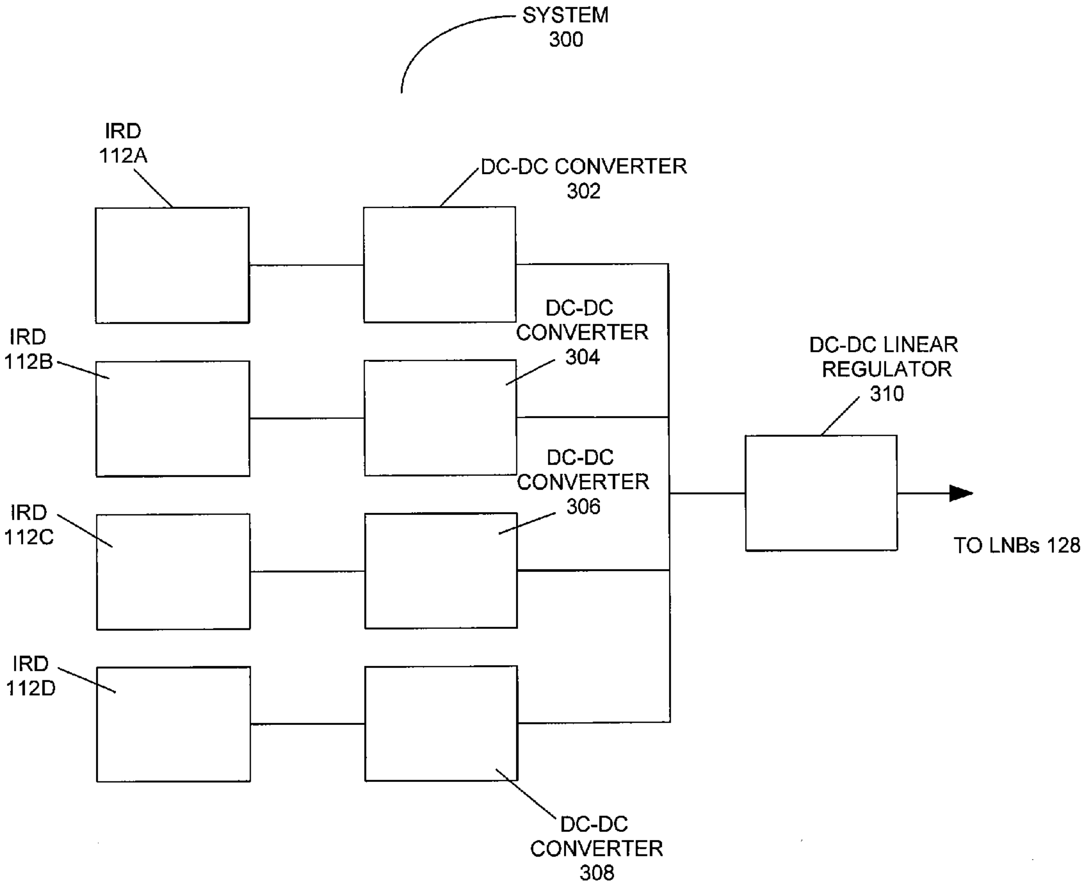
FIGS. 3 and 4 illustrate current sharing diagrams of the present invention.
Figure 4:
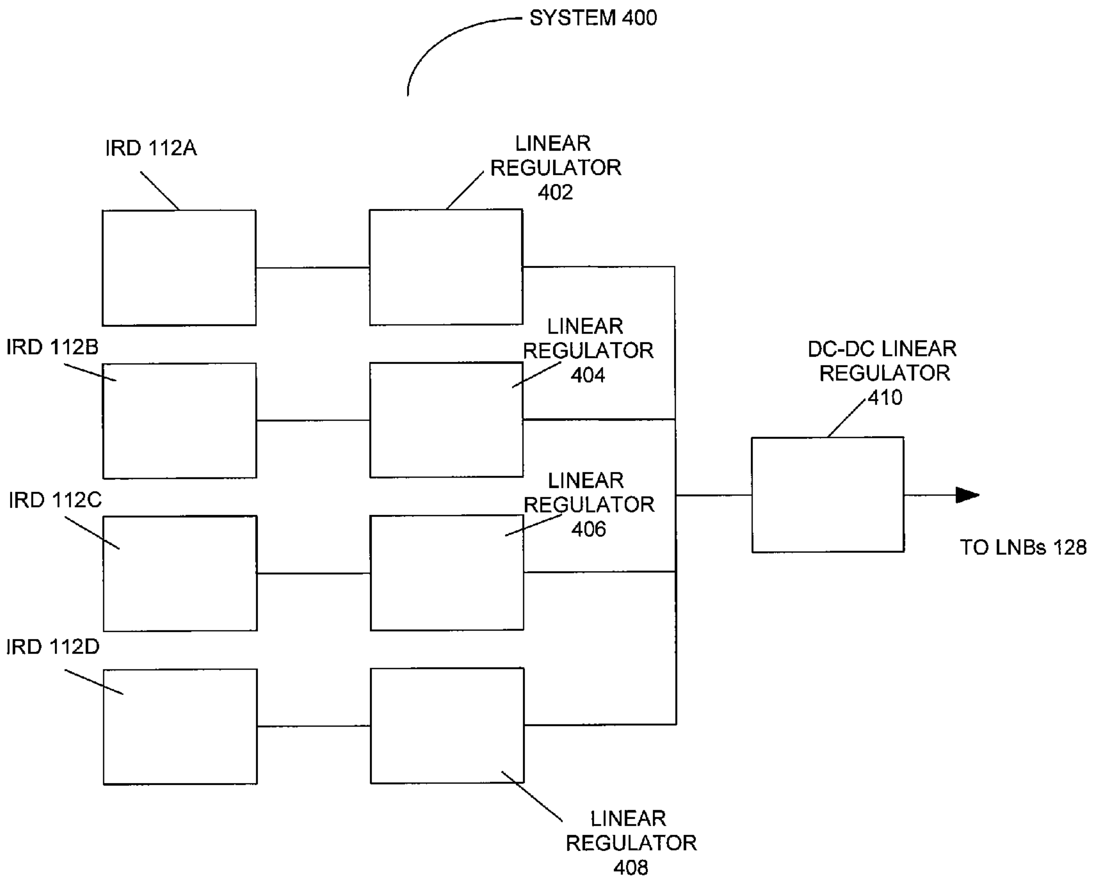

FIGS. 3 and 4 illustrate current sharing diagrams of the present invention.

As system 100 has expanded to include additional satellites at different orbital slots and different frequency bands, system 100 can no longer turn off LNBs 128 that are unused. In system 100 with additional satellites transmitting at the KA-band, three LNBs 128 must be powered at the same time for any given selection code (e.g., 13 VDC selects a Ka-band low LNB 128, a Ku-band LNB 128, and a Ka-band high LNB 128). Some selections will power four LNBs 128 at the same time.

In a typical dual LNB 128 system, whichever IRD 112 has a higher voltage present at the input to the LNB 128 provides all of the current to power LNB 128. In a typical triple LNB 128 system, linear regulators are used to provide some current sharing, however, regardless of input power, each regulator dissipates some power as heat because the LNB 128 only takes what is needed.

System 300 illustrates IRDs 112A-D coupled to DC-DC converters 302-308, which are each then coupled to DC-DC linear regulator 310. Each of the DC-DC converters 302-308 acts as a switching regulator, which switches on and off rather than require a constant current draw, therefore providing more efficient delivery of power to LNBs 128.

System 400 illustrates IRDs 112A-D coupled to DC-DC linear regulators 402-408, which are each then coupled to DC-DC converter 410. DC-DC converter 410 acts as a switching regulator, which switches on and off rather than require a constant current draw, therefore providing more efficient delivery of power to LNBs 128.

Figure 5:
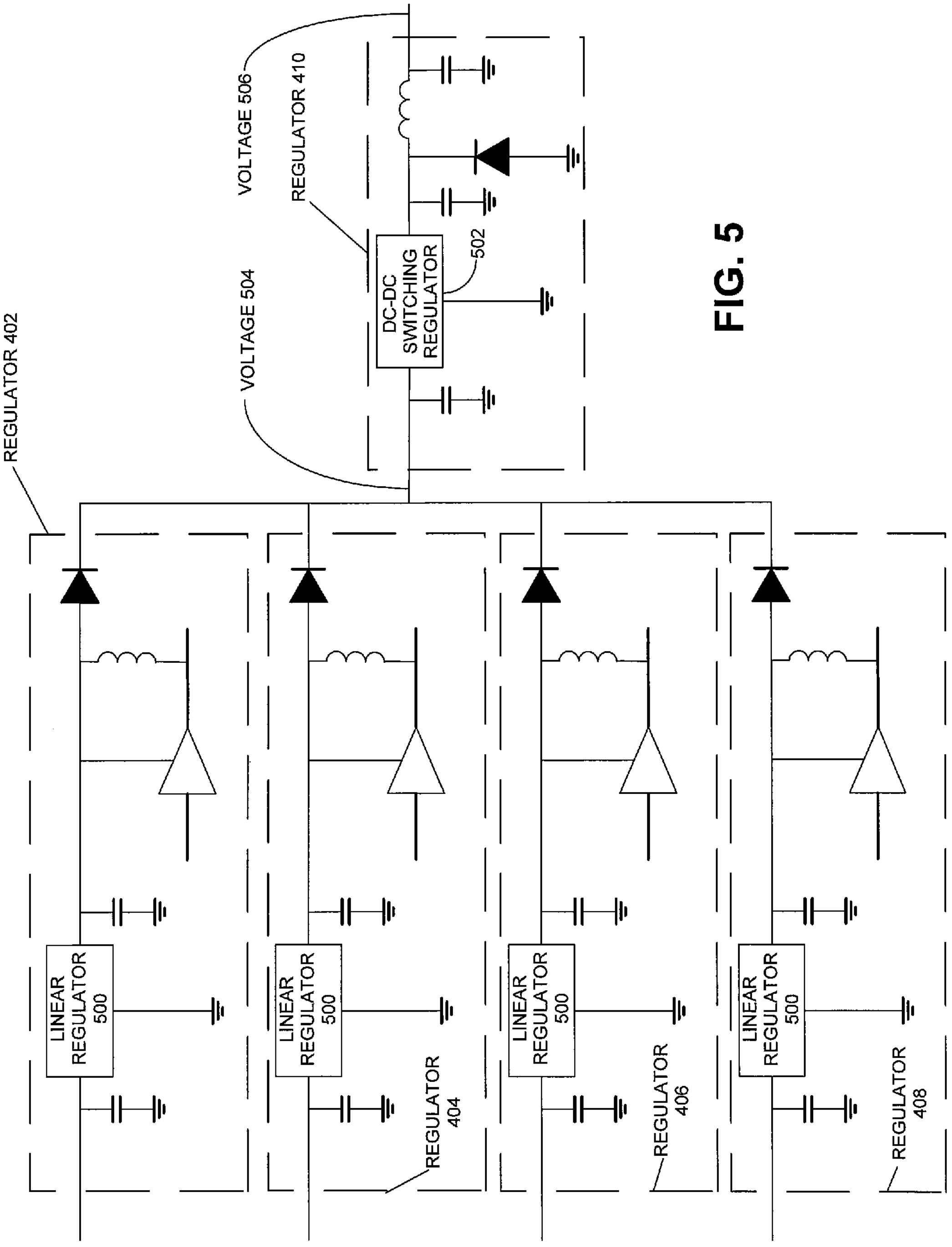
FIG. 5 illustrates a schematic diagram for an embodiment of the schema shown in FIG. 4.

FIG. 5 illustrates a schematic diagram for an embodiment of the schema shown in FIG. 4.

Linear Regulators 402-408, and DC-DC regulator 410 are shown, along with regulators 500 and DC-DC switching regulator 502. Regulators 400 are linear regulators, typically 7808 or 7809 regulators, while DC-DC switching regulator 502 is typically a 750 kHz regulator. The second stage of regulation provided by regulator 410 (or, as shown in FIG. 3, regulator 310), balances the current supplied by each of IRDs 112A-D, to allow for all LNBs 128 present in system 100 to be powered in a proper manner.

The interaction between regulator 410 with regulators 402-408 allows for a more dynamic sharing of the current requirements for LNBs 128, without overtaxing any one of the IRDs 112A-D in a given system 100.

Diodes shown in FIG. 5 are typically schottky diodes, but can be p-n diodes if desired. Further, the voltage present at point 504 is typically 8.1 volts, and the voltage present at point 506 is typically 5.1 volts, but these values can vary without departing from the scope of the present invention.

CONCLUSION

In summary, the present invention comprises a method, apparatus and system providing power to Low Noise Block Amplifiers (LNBs) in a satellite signal receiving system. wherein at least one receiver provides power to the LNBs. A system in accordance with the present invention comprises a first stage of power regulation, coupled to the at least one receiver in a respective fashion, wherein the first stage of power regulation comprises linear regulation, and a second stage of power regulation, coupled between the first stage of power regulation and the LNBs, wherein the second stage of power regulation comprises a switching power regulator.

Another embodiment of the present invention comprises a first stage of power regulation, coupled to the at least one receiver in a respective fashion, wherein the first stage of power regulation comprises a switching power regulator, and a second stage of power regulation, coupled between the first stage of power regulation and the LNBs, wherein the second stage of power regulation comprises a linear regulator.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A system for providing continuous power to Low Noise Block Amplifiers (LNBs) in a satellite signal receiving system, wherein each receiver in a plurality of receivers receives satellite signals on a satellite signal connection and provides the continuous power to all of the LNBs receiving the satellite signals, comprising:

a first stage of power regulation, coupled to each receiver in the plurality of receivers in a respective fashion, wherein the first stage of power regulation comprises linear regulation; and a second stage of power regulation, coupled between the first stage of power regulation and the LNBs, wherein the second stage of power regulation comprises a switching power regulator which switches on and off to balance current supplied by each receiver in the plurality of receivers to allow all of the LNBs to be powered in a proper manner;

the first stage of power regulation and the second stage of power regulation providing power regulation to the continuous power provided on the satellite signal connection from each receiver in the plurality of receivers to all of the LNBs.

2. The system of claim 1, wherein the first stage of power regulation and the second stage of power regulation allow the plurality of receivers to share power requirements.

3. The system of claim 2, wherein the switching power regulator is a DC-DC converter.

4. A system for providing continuous power to Low Noise Block Amplifiers (LNBs) in a satellite signal receiving system, wherein each receiver in a plurality of receivers receives satellite signals on a satellite signal connection and provides continuous power to all of the LNBs receiving the satellite signals, comprising:

a first stage of power regulation, coupled to each receiver in the plurality of receivers in a respective fashion, wherein the first stage of power regulation comprises a switching power regulator which switches on and off to balance current supplied by each reviver in the plurality of recievers to allow all of the LNBs to be powered in a proper manner; and a second stage of power regulation, coupled between the first stage of power regulation and the LNBs, wherein the second stage of power regulation comprises a linear regulator;

the first stage of power regulation and the second stage of power regulation providing power regulation to the continuous power provided on the satellite signal connection from each receiver in the plurality of receivers to all of the LNBs.

5. The system of claim 4, wherein the first stage of power regulation and the second stage of power regulation allow the plurality of receivers to share power requirements of the LNBs.

6. The system of claim 5, wherein the switching power regulator is a DC-DC converter.

7. A system for delivering satellite signals to a plurality of receivers from a plurality of satellites, wherein at least a first satellite in the plurality of satellites broadcasts a first set of satellite signals broadcast in a first frequency band, and at least a second satellite in the plurality of satellites broadcasts a second set of satellite signals in a second frequency band, the system comprising;

an antenna, the antenna receiving the first set of satellite signals and the second set of satellite signals, the antenna comprising Low Noise Block Amplifiers (LNBs);

a plurality of receivers, coupled to the LNBs, for receiving the first set of satellite signals and second set of satellite signals, wherein each receiver in the plurality of receivers receives the first set of satellite signals and the second set of satellite signals on a satellite signal connection and provides continuous power to the LNBs, and a first stage of power regulation, coupled between the each receiver and all of the LNBs, wherein the first stage of power regulation comprises a switching power regulator which switches on and off to balance current supplied by each reviver in the plurality of receivers to allow all of the LNBs to be powered in a proper manner; and a second stage of power regulation, coupled between the first stage of power regulation and the LNBs, wherein the second stage of power regulation comprises a linear regulator;

the first stage of power regulation and the second stage of power regulation providing power regulation to the continuous power provided on the satellite signal connection from the at least on receiver to all of the LNBs.

8. The system of claim 7, wherein the first stage of power regulation and the second stage of power regulation allow the plurality of receivers to share power requirements of the LNBs.

9. The system of claim 8, wherein the switching power regulator is a DC-DC converter.

* * * * *